United States Patent
Gorny

(10) Patent No.: US 11,716,295 B2
(45) Date of Patent: Aug. 1, 2023

(54) SYSTEM AND METHOD OF AUTOMATED COMMUNICATIONS VIA VERTICALIZATION

(71) Applicant: Nextiva, Inc., Scottsdale, AZ (US)

(72) Inventor: Tomas Gorny, Scottsdale, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 0 days.

(21) Appl. No.: 17/233,070

(22) Filed: Apr. 16, 2021

(65) Prior Publication Data

US 2021/0328946 A1   Oct. 21, 2021

Related U.S. Application Data

(60) Provisional application No. 63/012,747, filed on Apr. 20, 2020.

(51) Int. Cl.
*H04L 51/02* (2022.01)
*H04L 51/10* (2022.01)
(Continued)

(52) U.S. Cl.
CPC ............ *H04L 51/02* (2013.01); *G06F 40/35* (2020.01); *G06Q 30/0242* (2013.01); *H04L 51/10* (2013.01); *H04L 51/56* (2022.05)

(58) Field of Classification Search
CPC .. G06Q 10/10; G06Q 10/107; G06Q 30/0269; G06Q 30/0255; G06Q 30/0254;
(Continued)

(56) References Cited

U.S. PATENT DOCUMENTS

| 7,974,877 B2 * | 7/2011 | Ramanathan | G06Q 10/10 705/14.55 |
| 8,365,065 B2 * | 1/2013 | Gejdos | G16H 15/00 715/221 |

(Continued)

FOREIGN PATENT DOCUMENTS

| EP | 3770835 A1 * | 1/2021 | ............. G06N 20/00 |
| EP | 3798776 A1 * | 3/2021 | ............. G06F 17/16 |

(Continued)

OTHER PUBLICATIONS

Email Signature Rescue, "Customize your email signature", Mar. 11, 2019, Retrieved online from https://web.archive.org/web/20190311054651/https://emailsignaturerescue.com/email-signature-rescue-software/customize (Year: 2019).*

(Continued)

*Primary Examiner* — Hitesh Patel
*Assistant Examiner* — Sandarva Khanal
(74) *Attorney, Agent, or Firm* — Spencer Fane LLP; Steven J. Laureanti

(57) ABSTRACT

A system and method are disclosed to generate, transmit, and automate communications with end user systems. Embodiments comprise an automation platform comprising a processor and memory. Embodiments generate a communication based, at least in part, on input from a rules engine and one or more communication templates. Embodiments modify the content of the generated communication and revise the one or more communication templates to include the modifications made to the communication content. Embodiments transmit, using one or more communication channels, the modified communication to one or more end user systems, and automate the generation and transmission of one or more subsequent communications to the one or (Continued)

more end user systems based, at least in part, on the revised one or more communication templates.

14 Claims, 7 Drawing Sheets

(51) Int. Cl.
 *G06Q 30/0242* (2023.01)
 *G06F 40/35* (2020.01)
 *H04L 51/56* (2022.01)
(58) Field of Classification Search
 CPC .. G06Q 30/0242; G06Q 20/386; H04L 51/02; H04L 51/10; H04L 51/04; H04L 51/32; H04L 51/36; H04L 51/046; H04L 41/22; H04L 51/16; G06F 40/35; G06F 40/186; H04W 4/12
 See application file for complete search history.

(56) References Cited

U.S. PATENT DOCUMENTS

| | | | |
|---|---|---|---|
| 9,426,191 B2 | 8/2016 | Castanho et al. | |
| 10,019,532 B2 | 7/2018 | Dufor et al. | |
| 10,026,037 B2 | 7/2018 | Brigham | |
| 10,664,661 B2 | 5/2020 | Gorny | |
| 10,839,399 B2 | 11/2020 | Gorny | |
| 2005/0044149 A1* | 2/2005 | Regardie | G06Q 30/06 709/219 |
| 2005/0278297 A1* | 12/2005 | Nelson | G06F 16/958 |
| 2006/0200751 A1* | 9/2006 | Underwood | G06F 16/958 715/255 |
| 2007/0226340 A1* | 9/2007 | Hastings | H04L 67/63 709/226 |
| 2008/0288322 A1* | 11/2008 | Kennedy | G06Q 10/06 705/7.17 |
| 2013/0036138 A1* | 2/2013 | Bellows | G06Q 10/107 707/E17.014 |
| 2013/0174171 A1* | 7/2013 | Doster | G06F 9/4881 718/102 |
| 2014/0120961 A1* | 5/2014 | Buck | H04W 4/12 455/466 |
| 2016/0217391 A1* | 7/2016 | Brigham | G06Q 50/01 |
| 2016/0285789 A1* | 9/2016 | Hurst | H04L 51/02 |
| 2016/0294748 A1* | 10/2016 | Yang | G06Q 10/107 |
| 2017/0213007 A1* | 7/2017 | Moturu | G16H 20/10 |
| 2017/0270099 A1* | 9/2017 | Gorny | G06Q 30/02 |
| 2017/0277833 A1* | 9/2017 | Rabinovich | G06F 21/6263 |
| 2018/0024986 A1* | 1/2018 | Singh | G06F 16/313 704/9 |
| 2018/0364960 A1* | 12/2018 | Downs | G06F 3/1257 |
| 2019/0057393 A1* | 2/2019 | Gorny | G06Q 30/01 |
| 2019/0108487 A1* | 4/2019 | Foss | G06Q 10/107 |
| 2019/0197487 A1* | 6/2019 | Jersin | H04L 51/32 |
| 2019/0205370 A1 | 7/2019 | Zukerman et al. | |
| 2020/0167416 A1* | 5/2020 | Grajewski | H04L 51/10 |
| 2021/0224858 A1* | 7/2021 | Khoury | G06Q 30/0267 |

FOREIGN PATENT DOCUMENTS

| | | | | |
|---|---|---|---|---|
| WO | WO-0177939 A1 * | 10/2001 | | G06Q 10/107 |
| WO | WO-0215023 A1 * | 2/2002 | | G06F 16/958 |
| WO | WO-2007103646 A2 * | 9/2007 | | G06Q 30/02 |
| WO | WO-2019133919 A1 * | 7/2019 | | G06F 11/3466 |

OTHER PUBLICATIONS

Microsoft Support, "Create and add a signature to messages", Retrieved online from https://support.microsoft.com/en-us/office/create-and-add-a-signature-to-messages-8ee5d4f4-68fd-464a-a1c1-0e1c80bb27f2#ID0EBBF=Office_2007_-_2010 (Year: 2007).*
PCC Learn, "Configure Your Patient Portal Message Templates", as modified/published on Jun. 3, 2019, retrieved online on Sep. 7, 2022 from https://web.archive.org/web/20190605153255/http://learn.pcc.com:80/help/guide-to-portal-messaging-template-configuration/ (Year: 2019).*
Kuznietsova, "How to build an email with Stripo. Manual A to Z"; blog post originally posted on Apr. 24, 2019, updated on Dec. 5, 2019; Retreived online on Dec. 6, 2022 from https://stripo.email/blog/how-to-build-an-email-with-stripo-manual-a-to-z/ (Year: 2019).*
Ilhan, "600+ Free Email Templates from Email on Acid", Feb. 7, 2019. Retrieved online on Dec. 6, 2022 from https://web.archive.org/web/20190722201814/https://www.emailonacid.com/blog/article/email-development/600_free_email_templates/ (Year: 2019).*
International Search Report for PCT/US2021/028134 dated Jul. 27, 2021, 2 pages.

* cited by examiner

SYSTEM AND METHOD OF AUTOMATED COMMUNICATIONS VIA VERTICALIZATION

CROSS-REFERENCE TO RELATED APPLICATIONS

The present disclosure is related to that disclosed in the U.S. Provisional Application No. 63/012,747, filed Apr. 20, 2020, entitled "System and Method of Automated Communications via Verticalization." U.S. Provisional Application No. 63/012,747 is assigned to the assignee of the present application. The present invention hereby claims priority under 35 U.S.C. § 119(e) to U.S. Provisional Application No. 63/012,747.

TECHNICAL FIELD

The present disclosure relates generally to generating and modifying automated communications across various industries and markets, and specifically to planning, generating, modifying, and transmitting communications such as (but not limited to) emails, text messages, and voice messages to end users in a plurality of industries.

BACKGROUND

Modern companies may rely on a variety of communication techniques to reach consumers, advertise products, and gather customer feedback across a wide variety of communication channels including email, telephone calls, short message service (SMS) text messages, and other communication channels. Communication techniques may comprise, for example, communication surveys or communication campaigns that leverage multiple communication channels to interact with consumers. However, the process of generating and executing such campaigns and surveys may require the investment of significant company resources and time in order to select appropriate communication channels, draft and update communication messages or scripts, follow-up with previously-reached consumers at future dates, and calibrate communications to specific industries and customer demographics, which is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
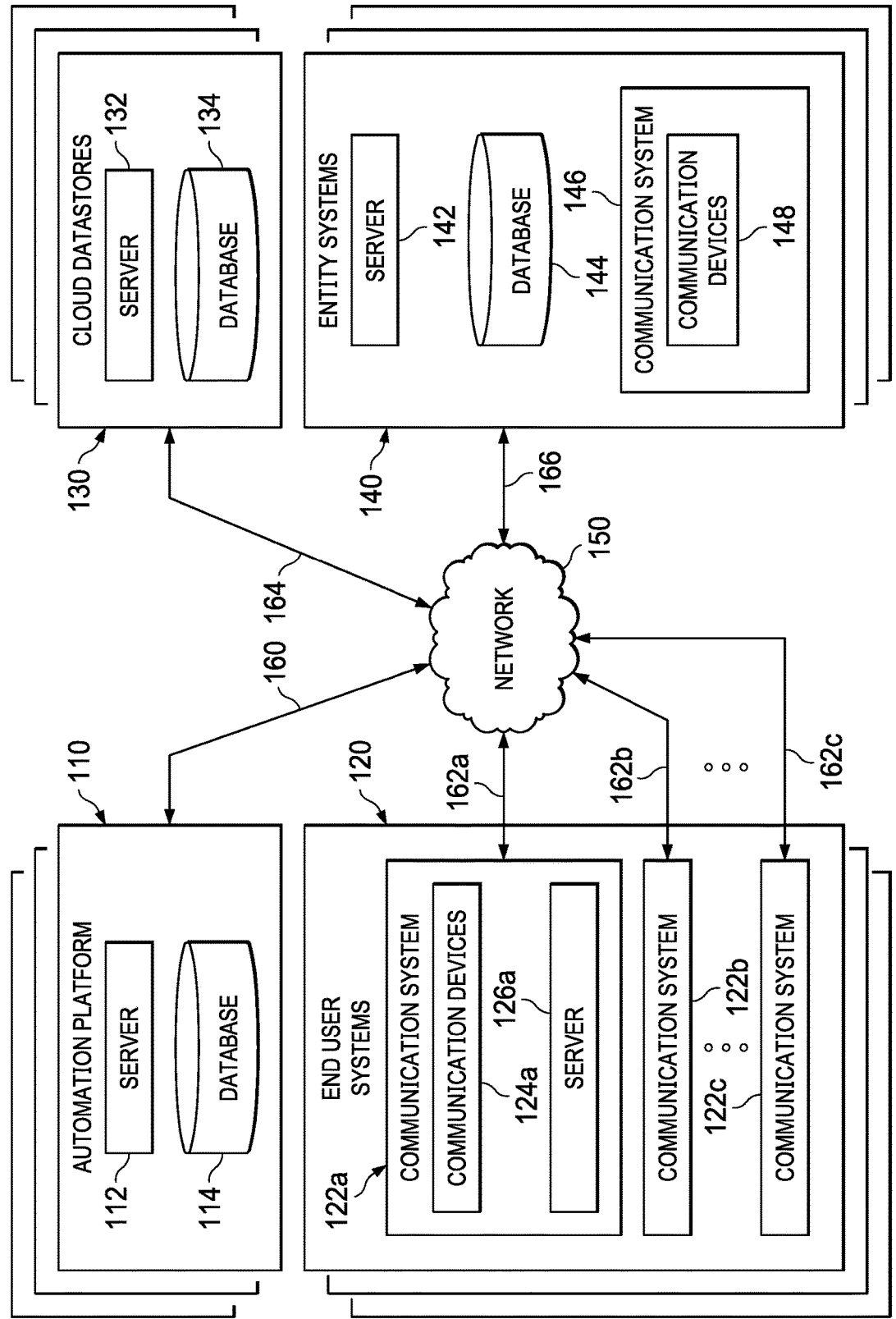
FIG. 1 illustrates an exemplary system, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to a system and method to coordinate customer communications, schedule interactions, and generate and automate communications across one or more communication channels. Embodiments of the following disclosure provide a communication automation platform that generates prepared communications, such as emails, SMS texts, voicemail messages, and/or communications across other communication channels, using one or more communication templates. The automation platform provides a front-end interface to permit simple and rapid alterations to the communications prepared from the templates, and stores updates to the templates in automation platform data. Embodiments generate and transmit configurable surveys and communication campaigns across communication channels, and automatically suggest and prepare follow-up communications at later dates. Embodiments select particular communications and channels according to verticalization practices and templates specific to a plurality of industries, such as, for example, real estate sales, insurance sales, and/or medical and dentistry practice management.

Embodiments of the following disclosure simplify the process of managing communications between customers and businesses and of generating customer-oriented communications. Embodiments enable organizations to manage the customer journey of each customer across email, text, voicemail, and other communication channels with a high degree of front-end communication customizability and flexibility, without requiring back-end programming or complicated scripting tasks to achieve the customizability. Embodiments use a rules engine to automatically adjust communication content based on context and past communication history across a plurality of communication channels, and according to industry-specific communication templates and verticalized sales methods.

FIG. 1 illustrates exemplary system 100, according to a first embodiment. System 100 comprises one or more automation platforms 110, one or more end user systems 120, one or more cloud datastores 130, one or more entity systems 140, network 150, and communication links 160-166. Although one or more automation platforms 110, one or more end user systems 120, one or more cloud datastores 130, one or more entity systems 140, single network 150, and communication links 160-166 are illustrated and described, embodiments contemplate any number of automation platforms 110, end user systems 120, cloud datastores 130, entity systems 140, networks 150, or communication links 160-166, according to particular needs.

In one embodiment, one or more automation platforms 110 comprises server 112 and database 114. Server 112 is programmed to automatically generate, and subsequently modify, one or more communications (such as, for example, emails, text messages, voicemail messages, and the like), surveys, and/or communication campaigns, according to industry-specific verticalized sales practices, as described in greater detail below. Database 114 comprises one or more databases 114 or other data storage arrangements at one or more locations, local to, or remote from, one or more automation platforms 110. In one embodiment, one or more databases 114 is coupled with one or more servers 112 using one or more local area networks (LANs), metropolitan area networks (MANs), wide area networks (WANs), or a network, such as, for example, the Internet, or any other appropriate wire line, wireless, or any other communication links. One or more databases 114 stores data that is made available and may be used by one or more servers 112 according to the operation of system 100. One or more automation platforms 110 may also include one or more processors and associated memory to execute instructions and manipulate information according to the operation of system 100.

In one embodiment, one or more end user systems 120 comprises customers such as, for example, a buyer, customer, retailer, or any other individual, business, or enterprise which communicates with one or more entity systems 140. One or more end user systems 120 comprise one or more communication systems 122 that send or receive communications to and from one or more entity systems 140. Each of one or more communication systems 122 may comprise one or more communication devices 124 and server 126, and may include any system located at one or more end user systems 120 that is configured to send and receive communications. Each communication device 124 may provide one or more end user systems 120 and one or more entity systems 140 a communication channel between one or more end user systems 120 and one or more entity systems 140. One or more end user systems 120 may be coupled with one or more entity systems 140 by network 150 via communication links 160-166. System 100 may monitor, among other data, end user systems data and communications data based on customer service representative scores, solution scores, customer service representative skill scores, customer satisfaction scores and communications among communication systems 122 at a single customer, among communication systems 122 located at multiple customers, and between multiple communication systems 122 and one or more entity systems 140.

In an embodiment, one or more cloud datastores 130 comprises server 132 and database 134. Cloud datastores 130 provide for the storage of data and hosting of programs or applications. According to embodiments, server 132 may host and run one or more runtime processes associated with automation platform 110. Server 132 comprises any server configured to access, update and provide data associated with one or more automation platforms 110, one or more end user systems 120 or one or more entity systems 140. Database 134 comprises one or more databases or other data storage arrangements at one or more locations, local to, or remote from, one or more automation platforms 110. In one embodiment, one or more databases 134 is coupled with one or more servers 132 using one or more LANs, WANs, MANs, or networks 150, such as, for example, the Internet, or any other appropriate wire line, wireless, or any other communication links 160-166. One or more databases 134 stores data that is made available and may be used by one or more end user systems 120, one or more entity systems 140, and the one or more servers 132 according to the operation of system 100.

According to embodiments, one or more entity systems 140 may be any entity, such as, for example, a business, company, entity, enterprise, distributor, retailer, call-center, CRM specialist system, customer service system, help desk system, telephone or media service, social media service (such as FACEBOOK, TWITTER, or the like) or any entity system that communicates with customers, either its own customers or the customers of other entity systems 140. One or more entity systems 140 may operate on one or more computers comprising one or more servers 142 and one or more databases 144 or other data storage arrangements at one or more locations which are integral to or separate from the hardware and/or software that supports system 100.

In addition, or as an alternative, one or more entity systems 140 may comprise one or more communication systems 146 that send or receive communications to and from one or more end user systems 120. Communication systems 146 may comprise communication devices 148, and include any system located at one or more entity systems 140 that is configured to send and receive communications. Each communication device may provide one or more entity systems 140 and one or more end user systems 120 a communication channel between one or more end user systems 120 and one or more entity systems 140. One or more entity systems 140 may utilize system 100 to monitor relationships and communication activity based on, for example, assigning a customer service ticket to a customer service representative and determining customer service representative scores, solution scores, customer service representative skill scores, customer satisfaction scores based on one or more customer service representative ranking factors and communications among communication systems 146 within a single entity system 140, among multiple communication systems 146 located at one or more entity systems 140, and between multiple entity systems 140 and multiple customers. In addition, communication systems 146 may each operate on separate computer systems or may operate on one or more shared computer systems. Each of these one or more computer systems may be a work station, personal computer, network 150 computer, laptop computer, notebook computer, tablet-type device, smartphone, terminal, or any other suitable communication device. In addition, communication devices 148 may comprise a land-line or VoIP telephone or telephone system.

One or more automation platforms 110 including server 112 and database 114 is coupled with network 150 using communication link 160, which may be any wireline, wireless, or other link suitable to support data communications between one or more automation platforms 110 and network 150. One or more end user systems 120 is coupled with network 150 using communication link 162, which may be any wireline, wireless, or other link suitable to support data communications between one or more end user systems 120 and network 150. One or more cloud datastores 130 including server 132 and database 134 is coupled with network 150 using communication link 164, which may be any wireline, wireless, or other link suitable to support data communications between one or more cloud datastores 130 and network 150. One or more entity systems 140, including server 142 and database 144, is coupled with network 150 using communication link 166, which may be any wireless or other link suitable to support data communications between one or more entity systems 140 and network 150.

Although communication links 160-166 are shown as generally coupling one or more automation platforms 110, one or more end user systems 120, one or more cloud datastores 130, and one or more entity systems 140 with network 150, one or more automation platforms 110, one or more end user systems 120, one or more cloud datastores 130, and one or more entity systems 140 may communicate directly with each other according to particular needs.

In an embodiment, network 150 includes the Internet, telephone lines, any appropriate local area networks LANs, MANs, or WANs, and any other communication network coupling one or more automation platforms 110, one or more end user systems 120, one or more cloud datastores 130, and one or more entity systems 140. For example, data may be maintained by one or more automation platforms 110 or one or more cloud datastores 130 at the one or more locations external to one or more automation platforms 110 and/or one or more cloud datastores 130 and made available to one or more automation platforms 110, one or more end user systems 120, one or more cloud datastores 130, one or more entity systems 140 using network 150 or in any other appropriate manner. Those skilled in the art will recognize that the complete structure and operation of communication within network 150 and other components within system 100 are not depicted or described. Embodiments may be employed in conjunction with known communications networks and other components.

In one embodiment, one or more automation platforms 110, one or more end user systems 120, one or more cloud datastores 130, and/or one or more entity systems 140 may each operate on one or more computers or computer systems that are integral to or separate from the hardware and/or software that support system 100. In addition or as an alternative, the one or more users or customer service representatives, may be associated with system 100 including one or more automation platforms 110, one or more end user systems 120, one or more cloud datastores 130, and/or one or more entity systems 140. These one or more users may include, for example, one or more computers programmed to autonomously handle monitoring communication activity between one or more end user systems 120 and one or more entity systems 140. As used herein, the term "computer" or "computer system" includes any suitable input device, such as a keypad, mouse, touch screen, microphone, or other device to input information, and any suitable output device, such as a computer monitor, printer, speakers, or other output device, that may display or convey information associated with the operation of system 100, including digital or analog data, visual information, or audio information. Furthermore, one or more computers may include any suitable fixed or removable non-transitory computer-readable storage media, such as magnetic computer disks, CD-ROMs, or other suitable media to receive output from and provide input to system 100. One or more computers may also include one or more processors and associated memory to execute instructions and manipulate information according to the operation of system 100.

In an embodiment, system 100 comprises one or more automation platforms 110 and/or one or more entity systems 140 that monitor and score customer service representatives based on one or more customer service representative ranking factors associated with one or more end user systems 120 and/or one or more entity systems 140. In this embodiment, one or more automation platforms 110 and/or one or more entity systems 140 may provide the customer service representative scores, solution scores, customer service representative skill scores, customer satisfaction scores to the one or more users associated with one or more entity systems 140. In addition, or as an alternative, system 100 stores and organizes customer service representative scores, solution scores, customer service representative skill scores, customer satisfaction scores based on customer service representative ranking factors, such as, for example, a customer service representative skill score associated with at least one of a plurality of topics, a customer satisfaction score associated with a closed customer service ticket, a total time to resolve a closed customer service ticket, whether the closed customer service ticket was reopened prior to final resolution, and the like.

By way of example only and not by limitation, embodiments contemplate entity system 140 comprising, for example, a call center, entity or a retail service desk and end user systems 120 being associated with a customer of one or more entity systems 140 which sold, serviced, or otherwise provides subscription services to customers. Such subscription services may include, for example, a cloud-based email or voice-over-internet-protocol (VOIP) service. Although particular services are described as subscription services, embodiments contemplate any service or relationship between one or more end user systems 120 and one or more entity systems 140.

Continuing with the above example, the customer associated with end user systems 120 may call entity system 140 and speak with a customer service representative to inquire about a password reset of a web-based email program. When entity system 140 receives a communication, over a communication channel, such as, for example, a telephone call, system 100 identifies the communication channel as being a voice channel initiated by the telephone call, categorizes the telephone call, in this example, as a password reset request, generates customer service representative scores, solution scores, customer service representative skill scores, customer satisfaction scores based on one or more customer service representative ranking factors. In addition, system 100 displays on a graphical user interface a recommendation to the customer service representative the top ranked knowledge resource based on the customer service representative scores, solution scores, customer service representative skill scores, customer satisfaction scores.

Although only a single user associated with end user systems 120 is described above; embodiments contemplate more than one user associated with end user systems 120. For example, if the user represents an organization or entity system 140, there may be more than one individual associated with the organization or entity system 140 that contacts entity systems 140. Likewise, although only a single point of contact, i.e., a customer service representative is described as being associated with one or more entity systems 140; embodiments contemplate more than one point of contact, i.e., multiple customer service representatives at one or more entity systems 140. For example, and as described above, if entity systems 140 provide subscription services to the customers, the customers may speak with different customer service representatives of entity systems 140 to inquire about various subscription services, various issues and at various times.

Figure 2:
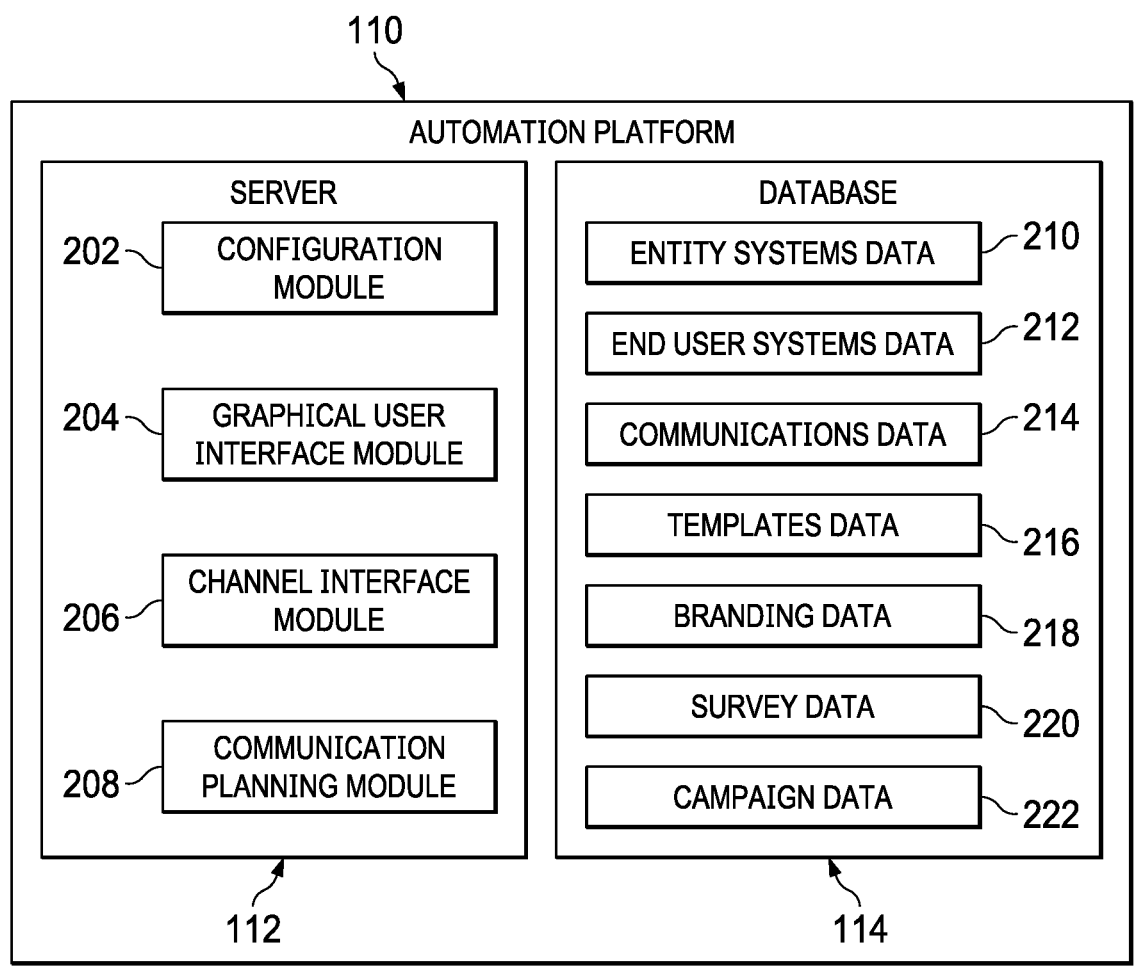
FIG. 2 illustrates the automation platform of FIG. 1 in greater detail, according to an embodiment.

FIG. 2 illustrates automation platform 110 of FIG. 1 in greater detail, according to an embodiment. Automation platform 110 may comprise server 112 and database 114. Although automation platform 110 is shown and described as comprising single server 112 and database 114, embodiments contemplate any suitable number of servers 112 or databases 114 internal to or externally coupled with automation platform 110. In addition, or as an alternative, automation platform 110 may be located internal to one or more entity systems 140. In other embodiments, automation platform 110 may be located external to one or more entity systems 140 and may be located in, for example, a corporate or regional entity system of one or more entity systems 140, according to particular needs.

Server 112 comprises configuration module 202, graphical user interface module 204, channel interface module 206, and communication planning module 208. Although a particular configuration of server 112 is shown and described, embodiments contemplate any suitable number or combination of configuration modules 202, graphical user interface modules 204, channel interface modules 206, communication planning modules 208, and/or other modules, located at one or more locations local to, or remote from, automation platform 110, according to particular needs. In addition, or as an alternative, configuration module 202, graphical user interface module 204, channel interface module 206, and communication planning module 208 may be located on multiple servers 112 or computers at any location in system 100.

Database 114 comprises entity systems data 210, end user systems data 212, communications data 214, templates data 216, branding data 218, survey data 220, and campaign data 222. Although database 114 is shown and described as comprising entity systems data 210, end user systems data 212, communications data 214, templates data 216, branding data 218, survey data 220, and campaign data 222, embodiments contemplate any suitable number or combination of these, located at one or more locations, local to, or remote from, automation platform 110, according to particular needs.

Entity systems data 210 of database 114 describes the identification information of one or more entity systems 140 of system 100. Entity systems data 210 comprises identification information, such as, for example, names, addresses, company information, telephone numbers, email, IP addresses, and the like. In one embodiment, configuration module 202 and communication planning module 208 access entity systems data 210 to identify one or more entity systems 140 in system 100 to generate particular configurations of system 100 specific to each of one or more entity systems 140. As an example only and not by way of limitation, where one or more entity systems 140 is a customer entity system 140, the identification information stored in entity systems data 210 permits automation platform 110 to generate a particularized user interface specific to the customer entity system 140. Although particular entity systems data 210 is described, embodiments contemplate any type of entity systems data 210 associated with one or more entity systems 140, according to particular needs.

End user systems data 212 of database 114 comprises end user information such as, for example, customer ID, customer social security number, customer reoccurring value, customer satisfaction level, customer age, customer sex, customer language, customer race, customer ethnicity, customer religion, customer location, customer highest education level, and customer annual income. Although particular end user systems data 212 is described, embodiments contemplate any type of end user systems data 212 associated with one or more end user systems 120, according to particular needs.

Communications data 214 of database 114 comprises the communications (such as, for example, individual or group emails, SMS text messages, and/or voicemail messages) generated or modified by automation platform 110 and/or transmitted between one or more entity systems 140 and one or more end user systems 120. According to an embodiment, communications data 214 also comprises the particular communication channels which are open to a particular end user system 120 or entity system 140, the times which the communication channels are open, the protocols or metadata which describe the communication, and/or any other setup data necessary to configure channel interface module 206, as described in greater detail below. In an embodiment, communications data 214 comprises calendar data that stores the date and time at which each communication took place between one or more end user systems 120 and one or more entity systems 140. In other embodiments, the calendar data may comprise scheduled communication activity deadlines (such as, for example, a deadline for entity system 140 to send an email to an end user system 120 customer by no later than Dec. 31, 2019), or sentiment scores assigning a subjective degree of positive or negative end user interaction associated with a particular communication.

Templates data 216 of database 114 comprises one or more prepared communication templates. Communication templates may comprise pre-written emails, text messages, voicemail scripts, or any other format of stored communication. By way of example only and not of limitation, in an embodiment, a communication template may comprise a pre-written email requesting that the recipient visit a website and participate in a voluntary survey. Communication planning module 208 may access the one or more prepared communication templates stored in templates data 216 in order to generate a communication template for graphical user interface module 204 to display on an output device. Templates data 216 may further comprise data regarding the communication channels available to system 100 through which channel interface module 206 may transmit one or more communications. In an embodiment, communication planning module 208 may modify and store changes to one or more communication templates in templates data 216 in response to input received from configuration module 202.

In an embodiment, templates data 216 may comprise one or more industry-specific communication templates. Industry-specific communication templates may comprise pre-written emails, text messages, voicemail scripts, or any other form of stored communications organized to be relevant for a particular industry. By way of example only and not by way of communication, templates data 216 may comprise industry-specific communication templates related to the real estate industry, the insurance industry, and medical practices and/or dentistry practices. Although particular industries are described herein, embodiments contemplate automation platform 110 database 114 storing industry-specific communication information relevant to any industry in templates data 216, survey data 220, and/or campaign data 222. Automation platform 110 may access industry-specific communication templates stored in templates data 216 to generate and transmit one or more communications leveraging current verticalization best practices for the particular industry, such as, for example, generating and transmitting a series of communications to a potential insurance purchaser that have successfully resulted in previous insurance clients purchasing insurance packages.

Branding data 218 of database 114 may comprise entity system 140 branding colors, fonts, logos, images, signature blocks, trademarks, trade dress selections, and/or other data selected to convey the unique identity of one or more entity systems 140 in one or more communications generated by communication planning module 208. By way of example only and not by way of limitation, branding data 218 may comprise data specifying that communication planning module 208 will generate, for a particular entity system 140, emails in 12-point Arial font, with entity system 140's signature block at the end of the email and entity system 140's company logo displayed beneath the signature block. Communication planning module 208 may access branding data 218 and may use branding data 218 to generate a communication (such as, for example, an email) configured to match the unique branding guidelines of one or more entity systems 140.

Survey data 220 of database 114 may comprise data defining one or more survey communications. In an embodiment, communication planning module 208 may transmit one or more surveys to one or more end user systems 120. Survey data 220 may comprise communications data 214 defining how communication planning module 208 will conduct the survey (such as, for example, by sending an email to an end user system 120 customer requesting that the customer fill out an online survey); calendar data defining when communication planning module 208 will transmit one or more survey communications to one or more end user systems 120 (such as, for example, one week after a customer has purchased a product); escalation procedures defining how communication planning module 208 will respond if an end user system 120 does not respond to a particular communication (such as, for example, transmitting a second email requesting that a customer participate in an online survey after the customer has failed to respond to a previous communication for one week, or transmitting a second email if communication planning module 208 assigns a sentiment score to the preceding communication that is below a specified value); or any other information defining the parameters of the survey, the questions contained in the survey, and/or the communication channels used to conduct the survey. In an embodiment, survey data 220 may comprise industry-specific survey communications comprising pre-written emails, text messages, voicemail scripts, or any other form of stored communications organized to be relevant for a particular industry.

Campaign data 222 of database 114 may comprise data defining one or more communication campaigns. A communication campaign may comprise a coordinated series of related communications (such as, for example, emails and voicemails related to a similar topic) and rules for transmitting follow-up communications (such as, for example, calling a customer to leave a voicemail message after the customer has failed to respond to a specified number of previous communications in the campaign). Communication planning module 208 may access campaign data 222 of database 114 to modify one or more communication campaigns and to transmit one or more communications according to the parameters of the one or more communication campaigns. In an embodiment, campaign data 222 may comprise one or more industry-specific communication campaigns leveraging current verticalization best practices for the particular industry, such as, for example, a communication campaign targeting potential first-time home buyers with a series of communications and defined response rules that have successfully resulted in previous home buyers purchasing houses.

Configuration module 202 may configure, update, and/or manage the operation of system 100. That is, configuration module 202 may provide services to configure the operation of system 100 and change which data is executed and/or stored on automation platform 110, one or more end user systems 120, one or more cloud datastores 130, and/or one or more entity systems 140. Embodiments contemplate a user-configurable system, such that the data may be stored either singularly or redundantly on automation platform 110, one or more end user systems 120, and/or one or more entity systems 140, according to particular needs. In addition, or as an alternative, configuration module 202 receives, processes, updates, creates, and stores entity systems data 210, end user systems data 212, communications data 214, templates data 216, and/or branding data 218.

Graphical user interface module 204 generates a graphical user interface comprising various features of end user systems data 212, templates data 216, branding data 218, survey data 220, and/or campaign data 222. Graphical user interface module 204 stores and retrieves data from database 114 including entity systems data 210, end user systems data 212, communications data 214, templates data 216, branding data 218, survey data 220, and campaign data 222. According to embodiments, graphical user interface module 204 generates and displays one or more configurations of graphical user interfaces displaying various aspects of prepared and modified communication templates, entity system 140 branding, surveys, campaigns, and workflow pipeline visualizations, as described in greater detail below.

Channel interface module 206 transmits, receives, and monitors communication activity between one or more end user systems 120 and one or more entity systems 140. For example, channel interface module 206 may comprise one or more of VOIP, email, internet or web-based chat, and/or other types of communication systems 122 and/or communication channels enabling one or more end user systems 120 to contact one or more entity systems 140 or one or more entity systems 140 to contact one or more end user systems 120 or other entity systems 140. According to embodiments, channel interface module 206 accesses communications stored in communications data 214 and transmits or receives communications to communication devices 124 of one or more communication systems 122. Channel interface module 206 may store the initiated or received communications, including the time of the communications, duration, date, voice, text, and other information transmitted in the communications, in communications data 214 of database 114.

Communication planning module 208 generates one or more communications for channel interface module 206 to transmit to one or more end user systems 120 and/or entity systems 140. Communication planning module 208 may access entity systems data 210, end user systems data 212, communications data 214, templates data 216, branding data 218, survey data 220, and/or campaign data 222 to generate one or more communications. In an embodiment, communication planning module 208 may access a prepared communication email template in templates data 216, branding colors stored in branding data 218, and a campaign schedule stored in campaign data 222, and may generate an email communication using the email template and branding colors to be transmitted to an end user system 120 at a date and time specified by the campaign schedule. Embodiments contemplate communication planning module 208 generating communications using a plurality of combinations of entity systems data 210, end user systems data 212, communications data 214, templates data 216, branding data 218, survey data 220, and/or campaign data 222, according to particular needs. Having generated one or more communications, communication planning module 208 may store the one or more communications in communications data 214.

Communication planning module 208 may comprise a rules engine. According to embodiments, the rules engine may generate one or more automated communications (such as, for example, an auto-generated email message) according to the parameters of the rules engine and/or one or more communication templates stored in templates data 216. The rules engine may access templates data 216 to generate one or more automated communications, and may modify the generated communications in response to input from one or more end user systems 120.

In an embodiment, communication planning module 208 may access the communications stored in communications data 214. The rules engine of communication planning module 208 may search the communications for one or more commonalities that occur in a plurality of separate communications. By way of example only and not by way of limitation, commonalities may comprise frequent email subject titles, groups of recipients, email text, SMS message text, voice and voicemail scripts, or any other information that occurs in a plurality of separate communications. The rules engine of communication planning module 208 may label a commonality as 'frequent' if it appears in one communication per day, one communication per week at a specific time, one communication per month to a specific recipient, or using any other criteria to locate frequent communication commonalities. Having detected one or more commonalities in a plurality of separate communications, the rules engine of communication planning module 208 may generate a new communication template comprising the one or more commonalities, and may store the new communication template in templates data 216. Automation platform 110 may generate future communications using the new communication template.

For example, in an embodiment, entity system 140 operatively associated with automation platform 110 may generate and transmit an email entitled "Weekly Status Update" every Friday afternoon. The rules engine of communication planning module 208 may search the communications stored in communications data 214, and determines that an email entitled "Weekly Status Update" is sent every Friday afternoon, and may generate a new "Weekly Status Update" email template, as described in greater detail below. Communication planning module 208 may store the new "Weekly Status Update" email template in templates data 216, and automation platform 110 may use the "Weekly Status Update" email template to generate future emails on the topic of weekly status updates.

In an embodiment, automation platform 110 monitors the communication activity between end user systems 120 and entity systems 140 and stores the monitored communication activity as communications data 214 in database 114. Communications data 214 may be collected by automation platform 110 and may comprise, for example, the time of a communication, the individual that initiated the communication, the communication channel used for the communication, a customer service representative skill score associated with at least one of a plurality of topics, a customer satisfaction score associated with a closed customer service ticket, a total time to resolve a closed customer service ticket, whether the closed customer service ticket was reopened prior to final resolution, and other data associated with the communication activity.

In addition, or as an alternative, automation platform 110 monitors communications between one or more entity systems 140 and one or more end user systems 120 and/or communications stored in communications data 214, and determines a sentiment score based on one or more sentiment criteria. In an embodiment, templates data 216 may comprise sentiment criteria information which enables the customer planning module to analyze communications stored in communications data 214 and assign to each communication a sentiment score, as described in greater detail below. Sentiment scores provide data inferring the feeling, behavior, viewpoint, and/or mindset of one or more end users of one or more end user systems 120 and/or one or more representatives of one or more entity systems 140 who participated in the particular communication. Communication planning module 208 may access sentiment criteria stored in templates data 216, and may use the sentiment criteria to assign a sentiment score to each communication stored in communications data 214. For example, communication planning module 208 may access one or more sentiment criteria stored in templates data 216 and use the sentiment criteria to perform a subjective analysis of the emotions of the words used in a particular communication stored in communications data 214. In an embodiment, communication planning module 208 may score the words with a numerical value sentiment score, such as, for example, a numerical value between 0 and 100, wherein 0 represents a highly negative end user interaction and sentiment score, and 100 represents a highly positive end user interaction and sentiment score. In other embodiments, communication planning module 208 may score words, sounds, images, messages, or any other communications with any number or configuration of sentiment scores, including but not limited to word sentiment scores (such as, for example, "happy," "sad," "satisfied," and/or "angry"), color-based sentiment scores (such as, for example, green color indicating a positive interaction, yellow color indicating a neutral reaction, and/or red color indicating a negative reaction), shape-based sentiment scores (such as, for example, a circle indicating a positive interaction, a triangle indicating a neutral reaction, and/or a square indicating a negative reaction), photographic image-based sentiment scores (such as, for example, an image of a smiling person to indicate a positive interaction and an image of a frowning person to indicate a negative interaction) and/or emoji-based sentiment scores (such as, for example, a "thumbs-up" emoji indicating a positive interaction and a "thumbs-down" emoji indicating a negative reaction).

In addition, or as an alternative, sentiment criteria stored in templates data 216 may comprise, for example, keyword criteria, which instruct communication planning module 208 to assign a lower sentiment score to a particular communication if words such as "frustrated" or "cancel" are present in that communication, and to assign a higher sentiment score if words such as "happy" or "resolved" are present. Embodiments further contemplate one or more entity systems 140 directly accessing sentiment criteria stored in templates data 216 and setting numerical values for sentiment scores. Although particular numerical values of the sentiment score and sentiment criteria are described, embodiments contemplate any numerical value of the sentiment score and any type of sentiment criteria, according to particular needs. In an embodiment, having created one or more sentiment scores for one or more communications, communication planning module 208 stores information regarding the one or more sentiment scores in communications data 214.

Figure 3:
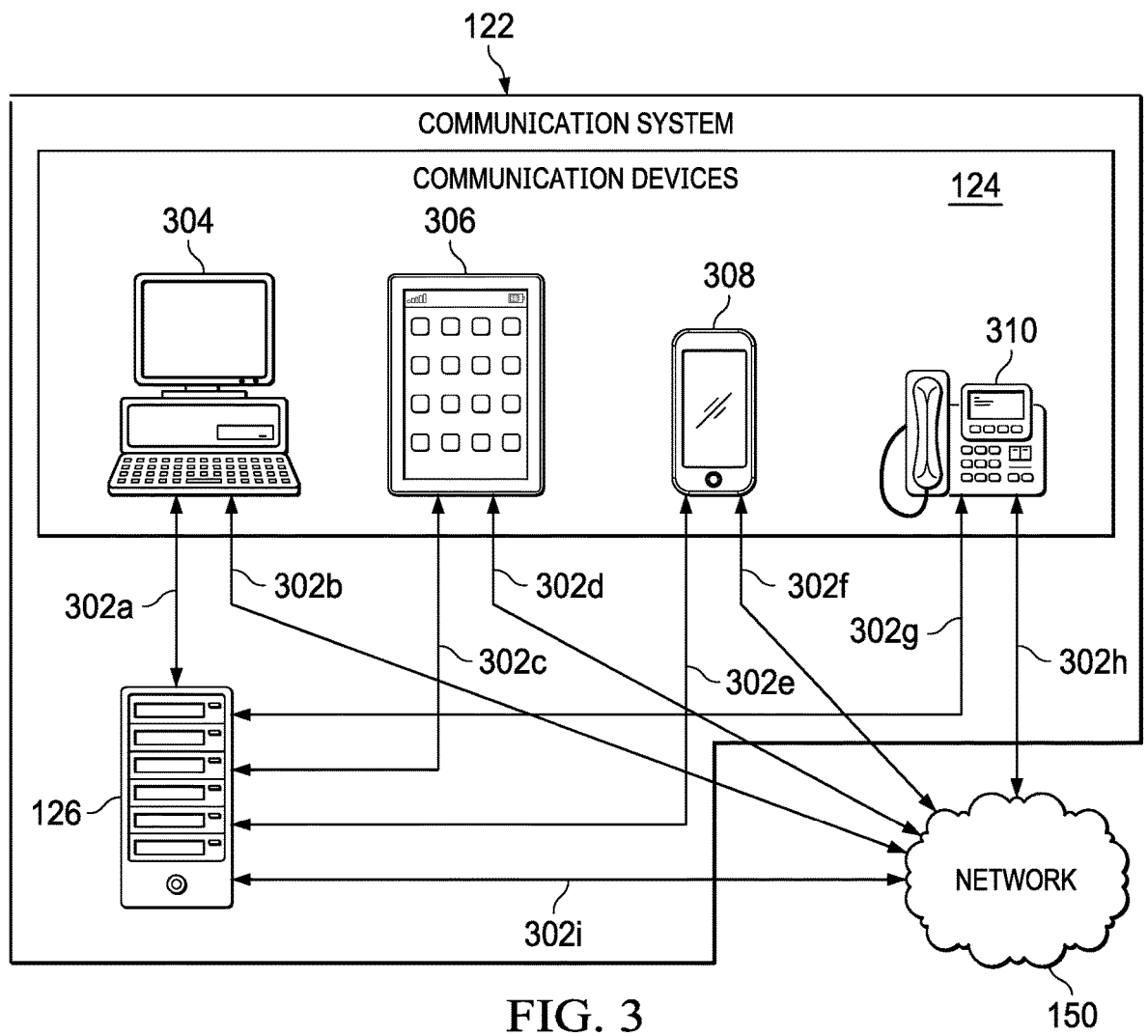
FIG. 3 illustrates the communication systems of one or more end user systems of FIG. 1 in greater detail, according to an embodiment.

FIG. 3 illustrates communication systems 122 of one or more end user systems 120 of FIG. 1 in greater detail, according to an embodiment. Although FIG. 3 illustrates communication system 122 and communication devices 124 of one or more end user systems 120, embodiments contemplate communication systems 146 and communication devices 148 of one or more entity systems 140 being configured in a similar fashion, according to particular needs. Communication systems 122 may comprise communication devices 124, server 126, and/or communication channels 302a-302i which may be configured to communicate with network 150, automation platform 110, one or more cloud datastores 130, and communication devices 146 of one or more entity systems 140, according to embodiments. In one embodiment, one or more communication systems 122 may each operate on separate computer systems or may operate on one or more shared computer systems. Each of these one or more computer systems may be computer system 304, such as a work station, personal computer, network computer, laptop computer, notebook computer, tablet-type device 306, smartphone 308, terminal, or any other suitable communication device. In addition, communication devices 124 may comprise land-line telephone 310 or VoIP telephone. According to embodiments each communication device 124 is configured to communicate with other communication devices 124 over one or more communication channels 302a-302i.

Computer system 304, one or more tablet-type devices 306, smartphones 308, and land-line telephones 310 or VoIP telephones may each comprise a processor, memory and data storage. The processor may execute an operating system program stored in memory to control the overall operation of computer system 304, one or more tablet-type devices 306 and/or smartphones 308. For example, the processor may control the reception of signals and the transmission of signals within system 100. The processor may execute other processes and programs resident in memory, such as, for example, registration, identification or communication over the communication channels and moving data into or out of the memory, as required by an executing process.

Those skilled in the art will recognize that one or more specific examples of communication systems 122 are given by way of example and that for simplicity and clarity, only so much of the construction and operation of one or more communication systems 122 as is necessary for an understanding of the present invention is shown and described. Moreover, it is understood that one or more communication systems 122 should not be construed to limit the types of devices in which embodiments of the present invention may be implemented. For example, one or more communication systems 122 may be any device, including, but not limited to, conventional cellular or mobile telephones, smart mobile phones, an iPhone, an iPad, wireless tablet devices, paging devices, personal digital assistant devices, short message service (SMS) wireless devices, portable computers, or any other device capable of wireless or network 150 communication.

According to embodiments, each of one or more communication devices 124 may be assigned one or more identification numbers, such as IP addresses, serial numbers, or telephone numbers that may be used to identify communication devices 124. According to embodiments, each communication device is associated with an identification number, such as an IP or MAC address. In addition, or as an alternative, communication systems 122 may be local to or remote from one or more end user systems 120 devices and one or more entity systems 140. That is, communication devices 124 of one or more end user systems 120 may communicate with communication devices 148 of one or more entity systems 140. For example, automation platform 110 is programmed to monitor and analyze communication activity via communication channels, such as, for example, telephone calls, emails, instant, chat or text messaging, and any other communication activity between the communication of one or more end user systems 120 and communication devices 148 of one or more entity systems 140.

Figure 4:
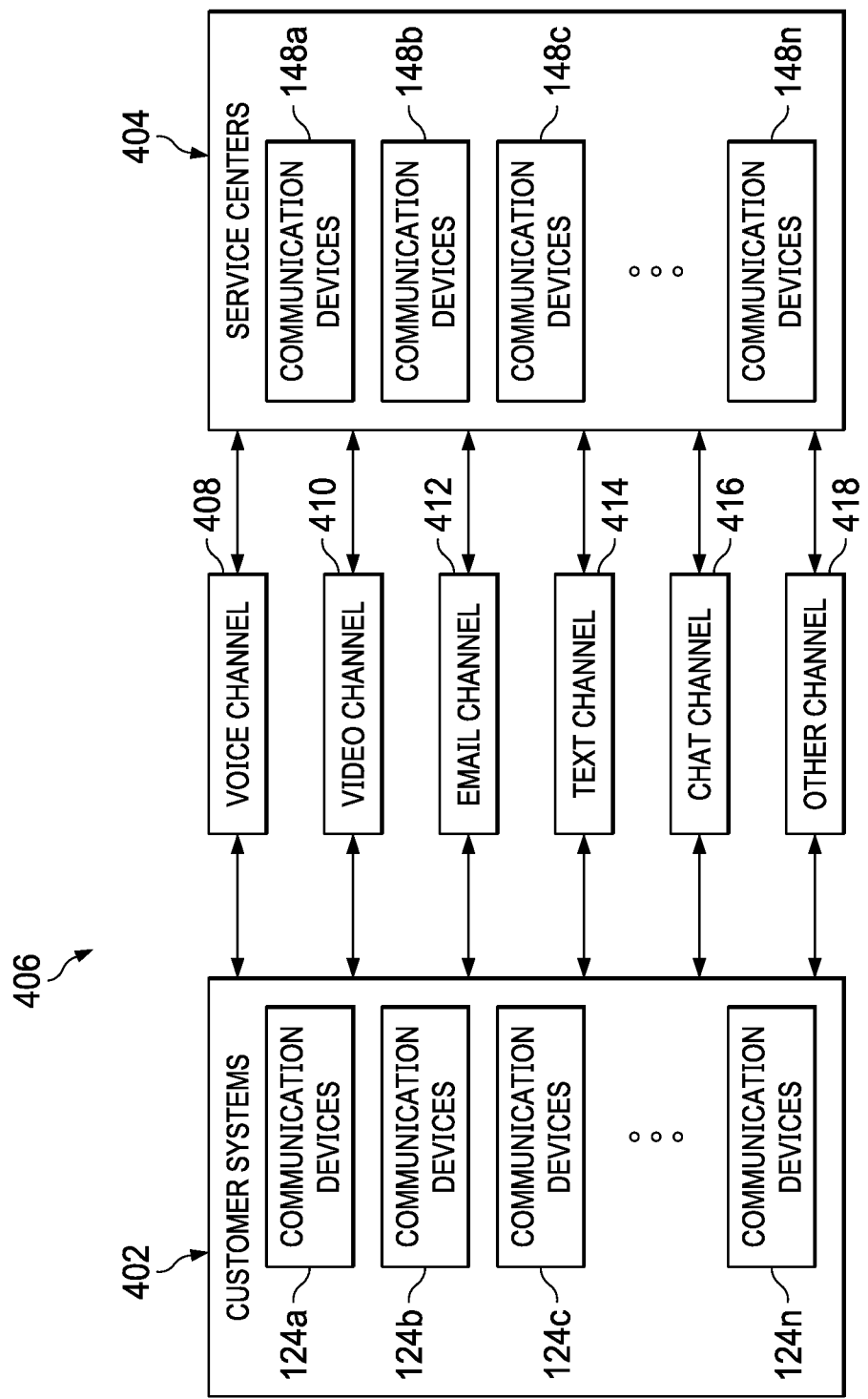
FIG. 4 illustrates the communication channels associated with one or more end user system customer systems and one or more entity system service centers, according to an embodiment.

FIG. 4 illustrates the communication channels associated with one or more end user system 120 customer systems 402 and one or more entity system 140 service centers 404, according to an embodiment. As described above, each of communication devices 124 of one or more end user systems 120 (including but not limited to one or more customer systems 402) may communicate with each of communication devices 148 of one or more entity systems 140 (including but not limited to one or more service centers 404) via one or more communication channels 406.

In addition, and as described above, if service center 404 provides subscription services to a customer, one or more users associated with customer systems 402 may communicate with one or more customer service representatives of service center 404 over various communication channels 406. As an example only and not by way of limitation, a user of customer systems 402 communication device may use a cell phone or land line communication device 124 to communicate with a customer service representative of service center 404 using voice communication channel 408 to inquire about various subscription service issues. On a subsequent occasion, the same user may use second communication device 124 or the same communication device 124 to communicate with a different customer service representative using second communication channel 406 to inquire about other subscription service issues. Although particular communication devices 124 and associated communication channels 406 are illustrated and described, embodiments contemplate any number of users associated with communication devices 124, any number of customer service representatives associated with communication devices 124 and any communication channels 406 (including but not limited to video channel 410, email channel 412, text channel 414, chat channel 416, and/or other channel 418), according to particular needs.

System 100 may leverage the identity of communication devices 124 and the communication activity over communication channels 406 for each communication device 124 to collect information about communication activity between one or more end user systems 120 and one or more entity systems 140, as described herein. Such information may then be used to determine customer service representative scores, solution scores, customer service representative skill scores, customer satisfaction scores for providing branding data 218 about a customer service ticket to a customer service representative, and/or communication sentiment scores.

Figure 5:
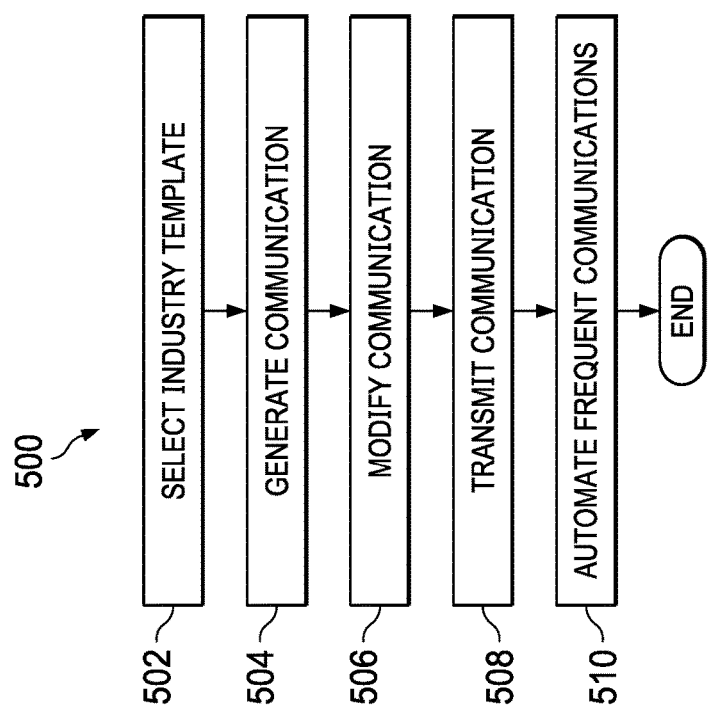
FIG. 5 illustrates an exemplary method of generating, modifying, transmitting, and automating communications, according to an embodiment.

FIG. 5 illustrates exemplary method 500 of generating, modifying, transmitting, and automating communications, according to an embodiment. Method 500 proceeds by one or more actions, which although described in a particular order may be performed in one or more other permutations, according to particular needs. In an embodiment, the actions may comprise: selecting an industry template as action 502, generating a communication as action 504, modifying the communication as action 506, transmitting the communication as action 508, and automating frequent communications as action 510.

At action 502, and according to embodiments, automation platform 110 selects an industry template (such as, for example, a real estate template, insurance industry template, or dentistry practice template) from which to generate a communication (such as, for example, an email message, SMS text message, or voicemail message). In an embodiment, and as described in greater detail below, graphical user interface module 204 accesses templates data 216, survey data 220, and/or campaign data 222, and generates industry selection interface 602, illustrated by FIG. 6, that displays the industry templates available through which automation platform 110 may generate and transmit the communication. Graphical user interface module 204 displays industry selection interface 602 on one or more output devices, such as, for example, a computer monitor. Configuration module 202 responds to input from one or more input devices, and selects an industry from the options presented on industry selection interface 602.

At action 504, and according to embodiments, automation platform 110 generates a communication. Graphical user interface module 204 generates a communication configuration interface 702, illustrated by FIG. 7, which provides for the selection of a plurality of communication options for the selected industry. Configuration module 202 selects one or more communication configuration options displayed on communication configuration interface 702 in response to input from one or more input devices. Based on the selected communication configuration options, communication planning module 208 generates a communication and stores the communication in communications data 214.

At action 506, and according to embodiments, automation platform 110 modifies the generated communication. Graphical user interface module 204 accesses communications data 214 and generates communication modification interface 802a, illustrated by FIG. 8, and displays communication modification interface 802a on one or more output devices. Communication modification interface 802a permits configuration module 202 to modify, in response to input from one or more input devices, the communication generated by communication planning module 208. By way of example only and not by way of limitation, communication modification interface 802a may display an email communication generated by communication planning module 208, and configuration module 202 may modify or delete particular sections of email text in response to input from one or more input devices. Communication planning module 208 stores the modified communication in communications data 214.

At action 508, and according to embodiments, automation platform 110 transmits the communication to one or more end user systems 120 and/or one or more entity systems 140. In an embodiment, channel interface module 206 accesses the communication stored in communications data 214, including communications data 214 specifying the date and time at which channel interface module 206 should send the communication to the designated recipient. Depending on the recipient specified in communications data 214, channel interface module 206 accesses the contact information (such as, for example, an email address, a telephone number, or a physical address) of entity system 140 and/or end user system 120 that will receive the communication, stored in entity systems data 210 and/or end user systems data 212. Channel interface module 206 then transmits the communication to the recipient end user system 120 and/or entity system 140 at the specified date and time.

At action 510, and according to embodiments, automation platform 110 automates frequent communications. Communication planning module 208 may access the communications stored in communications data 214, and the rules engine of communication planning module 208 may search the communications for one or more commonalities that occur in a plurality of separate communications. When the rules engine of communication planning module 208 detects one or more commonalities in a plurality of separate communications, communication planning module 208 rules engine may generate a new communication template comprising the one or more commonalities, and may store the new communication template in templates data 216. As described in greater detail below, and according to embodiments, graphical user interface module 204 may access communications data 214 and templates data 216, and generate communication modification interface 802a with task automation prompt 902, illustrated by FIG. 9. Configuration module 202 may respond to input from one or more input devices, and may select one or more task automation options from the options presented on task automation prompt 902.

Figure 6:
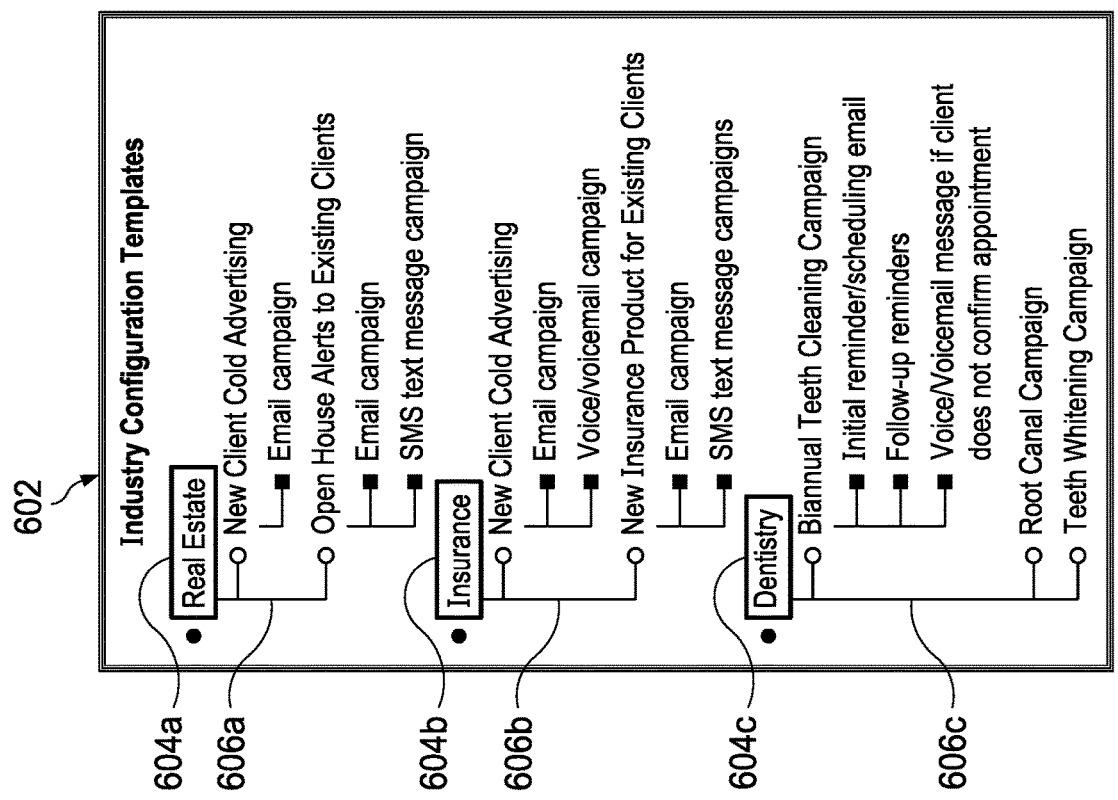
FIG. 6 illustrates an exemplary industry selection interface, according to an embodiment.

FIG. 6 illustrates exemplary industry selection interface 602, according to an embodiment. Industry selection interface 602 may comprise a list of available industries 604 (such as, in this embodiment, real estate industry 604a, insurance industry 604b, and dentistry industry 604c) and drop-down menus 606a-606c displaying the types of communications, communication templates, and/or communication campaigns associated with each industry (such as, in this embodiment drop-down menus 606a and 606b comprising "New Client Cold Advertising" and "Open House Alerts to Existing Clients" for real estate industry 604a and insurance industry 604b, respectively, and drop-down menu 606c comprising "Biannual Teeth Cleaning Campaign," "Root Canal Campaign," and "Teeth Whitening Campaign" for dentistry industry 604c, among other illustrated examples). Although particular industries and communications/communication campaigns associated with each industry are shown and described, embodiments contemplate industry selection interfaces 602 comprising any configuration of available industries 604, drop-down menus 604, industry-associated communications/communication campaigns, and/or other information drawn from entity systems data 210, end user systems data, communications data 214, templates data 216, branding data 218, survey data 220, and/or campaign data 222, according to particular needs. In an embodiment, graphical user interface module 204 accesses templates data 216 and campaign data 222, and generates industry selection interface 602.

In an embodiment, available industries 604, drop-down menus 606, and associated communications/communication campaigns comprise real estate industry 604a, insurance industry 604b, and dentistry industry 604c. In other embodiments, available industries 604 and associated communications/communication campaigns may comprise any industry. In an embodiment, configuration module 202 responds to input from one or more input devices, such as a computer mouse moving a cursor across industry selection interface 602. Configuration module 202 may interpret input from one or more input devices to select an industry from the options presented on industry selection interface 602. By way of example only and not by way of limitation, configuration module 202 may respond to input from one or more input devices, such as a touchscreen, to select dentistry industry 604c. Continuing the example, graphical user interface module 204 may generate one or more communication configuration interfaces 702 permitting the configuration of one or more dentistry-related communications in response to configuration module 202's selection of dentistry industry 604c. An embodiment of one or more communication configuration interfaces 702, displaying in this example communication configuration options related to dentistry industry 604c, is illustrated in FIG. 7.

Figure 7:
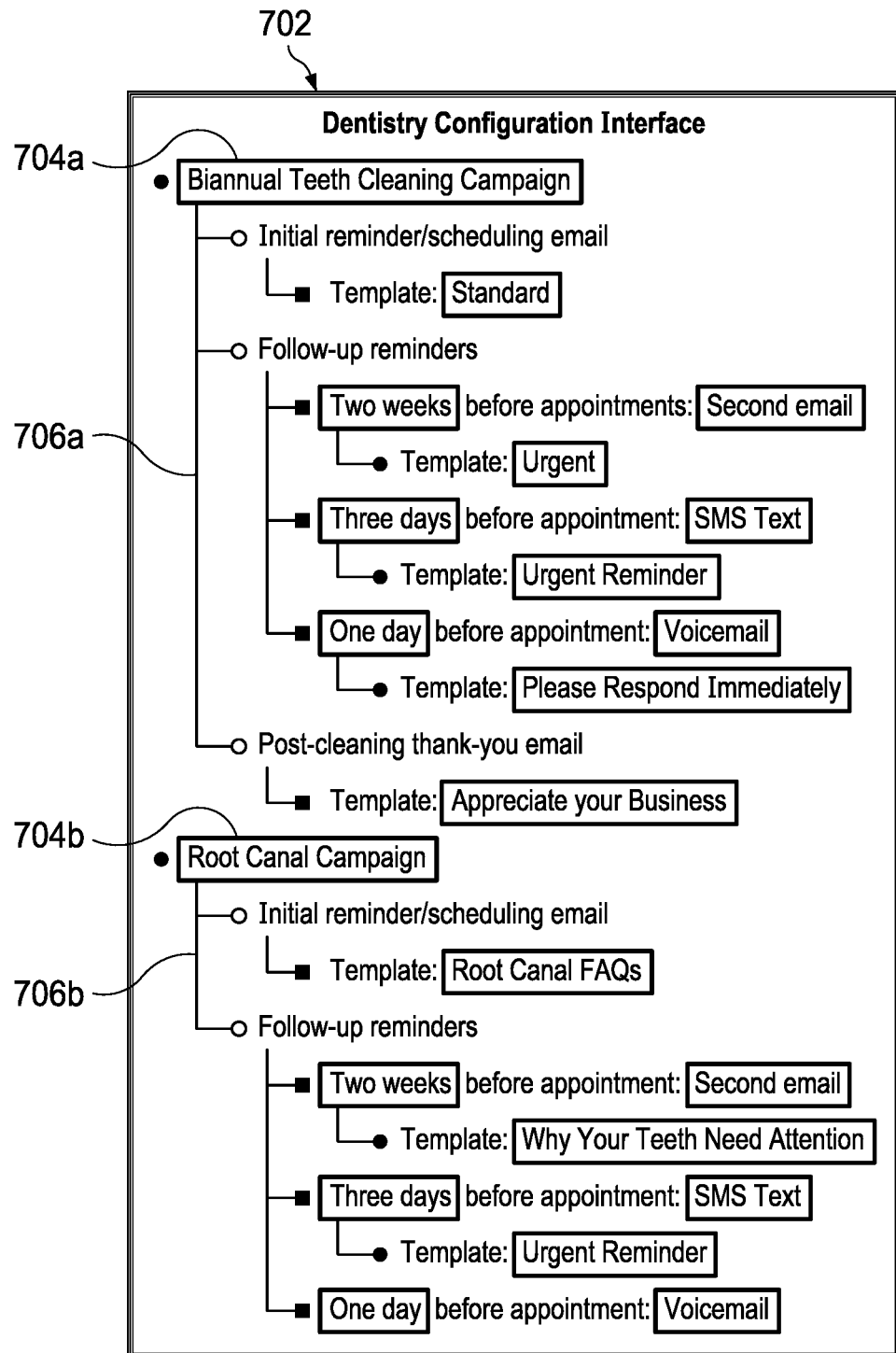
FIG. 7 illustrates an exemplary communication configuration interface, according to an embodiment.

FIG. 7 illustrates communication configuration interface 702, according to an embodiment. In the embodiment illustrated by FIG. 7, communication configuration interface 702 displays communication configuration options related to dentistry industry 604c; other communication configuration interfaces 702 may display communication configuration options related to any industry, according to particular needs. As illustrated by FIG. 7, dentistry communication configuration interface 702 comprises list of available communication templates 704a-704b (such as, in this embodiment, "Biannual Teeth Cleaning Campaign" communication template 704a and "Root Canal" communication template 704b) and list of communication channel scheduling options 706a-706b (such as, in this embodiment, selecting the time at which channel interface module 206 will transmit a particular communication, the communication channel that channel interface module 206 will use to do so, and one or more communication templates that communication planning module 208 will use to generate each particular communication). Although particular communication configuration options are shown and described, embodiments contemplate dentistry communication configuration interfaces 702 configuring any communication channels, subjects, content generated from one or more communication templates, or other parameters, according to particular needs. In an embodiment, graphical user interface module 204 accesses templates data 216 and campaign data 222, and generates dentistry communication configuration interface 702 illustrated by FIG. 7. According to embodiments, and as previously described with respect to FIG. 6, configuration module 202 may respond to input received from one or more input devices to configure the configuration options displayed by dentistry communication configuration interface 702.

According to the embodiment illustrated in FIG. 7, communication templates 704a-704b may comprise one or more previously-generated dentistry-related templates pertaining to a variety of communication topics applicable to dental industry 604c. By way of example only and not by way of limitation, communication templates 704a-704b may comprise a campaign of related email, SMS text, and voicemail communications to communicate with a patient and schedule an upcoming teeth cleaning appointment; and a campaign of related email, SMS text, and voicemail communications to communicate with a patient regarding a root canal operation. Although particular dentistry-related communication templates 704a-704b are shown and described, embodiments contemplate any number or configuration of communication templates across any number of subjects, according to particular needs.

Figure 8:
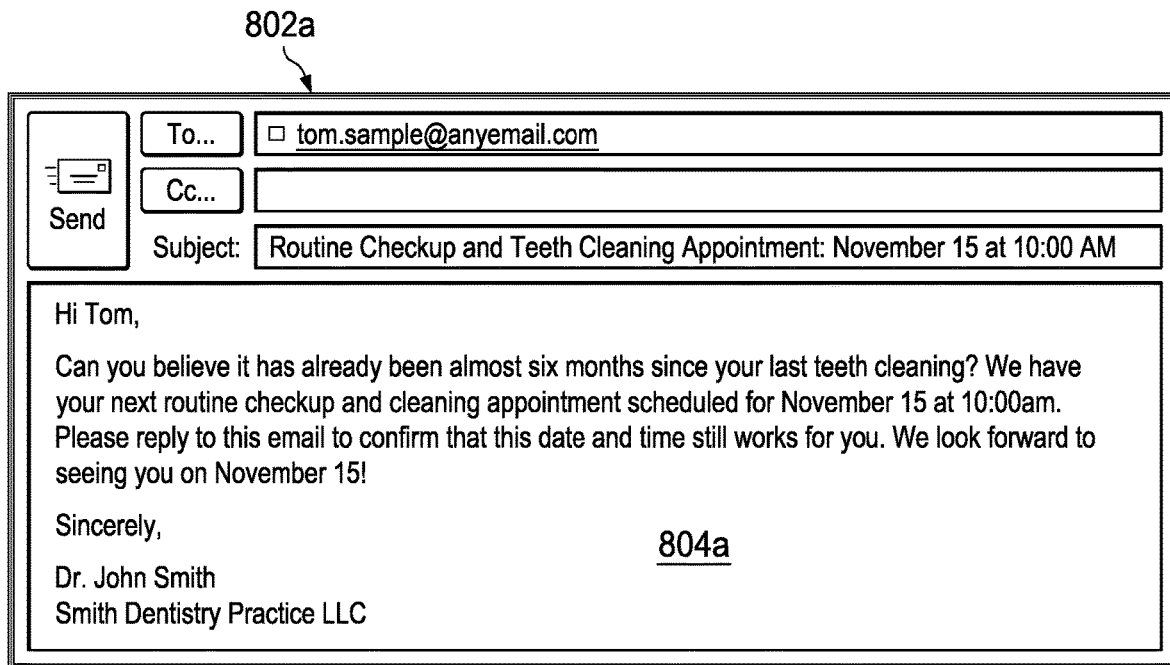
FIG. 8 illustrates an exemplary communication modification interface, according to an embodiment.

FIG. 8 illustrates exemplary communication modification interface 802a, according to an embodiment. In the embodiment illustrated by FIG. 8, communication modification interface 802a comprises an email modification interface; other communication modification interfaces 802a may display and modify any form of communications, including but not limited to SMS texts and/or voicemail messages, according to particular needs. In the embodiment illustrated by FIG. 8, email communication modification interface 802a may comprise pre-generated email template 804a, generated by communication planning module 208 in response to the configuration parameters selected by configuration module 202 using dentistry communication configuration interface 702 (illustrated by FIG. 7). Pre-generated email template 804a may comprise a pre-generated email draft, such as, for example, a Microsoft Outlook email draft, comprising text generated by communication planning module 208 according to one or more communication templates. Although particular pre-generated email templates 804a are shown and described, embodiments contemplate communication planning module 208 generating any configuration of email templates 804a, and/or any other form of communication template (including but not limited to SMS text templates and/or voicemail templates), according to particular needs.

In an embodiment, communication planning module 208 may access the communication configuration parameters stored by configuration module 202 in communications data 214, as well as templates data 216 and branding data 218. Communication planning module 208 may generate email template 804a using the templates stored in templates data 216 and comprising the entity system 140 colors, fonts, and other intellectual property specified in branding data 218. Communication planning module 208 may store the email draft generated using email template 804a in communications data 214. Graphical user interface module 204 may access communications data 214, and may display the generated email draft using the pre-generated email communication modification interface 802a illustrated by FIG. 8.

In an embodiment, configuration module 202 may modify or delete particular sections of email text in response to input from one or more input devices. By way of example only and not by way of limitation, configuration module 202 may add an additional sentence to the email communication generated by communication planning module 208 and displayed on the communication modification interface 802a illustrated by FIG. 8. In other embodiments, configuration module 202 may delete sentences from the email communication, modify the email communication's subject line or list of recipients, modify the email communication's signature block, or make any other modifications to the email communication. In still other embodiments, configuration module 202 may make any modification to any form of communication, such as, for example, by adding a pre-recorded message to an audio communication. Communication planning module 208 may store the modifications configuration module 202 made to the email communication in communications data 214. In an embodiment, communication planning module 208 may update email template 804a used by communication planning module 208 to generate the initial email communication to reflect the modifications configuration module 202 made to the email communication. In this matter, communication planning module 208 may generate subsequent email communications using updated communication templates (including but not limited to updated email communication templates) that incorporate, without any additional modification necessary, the modifications configuration module 202 made to the preceding email communication.

Figure 9:
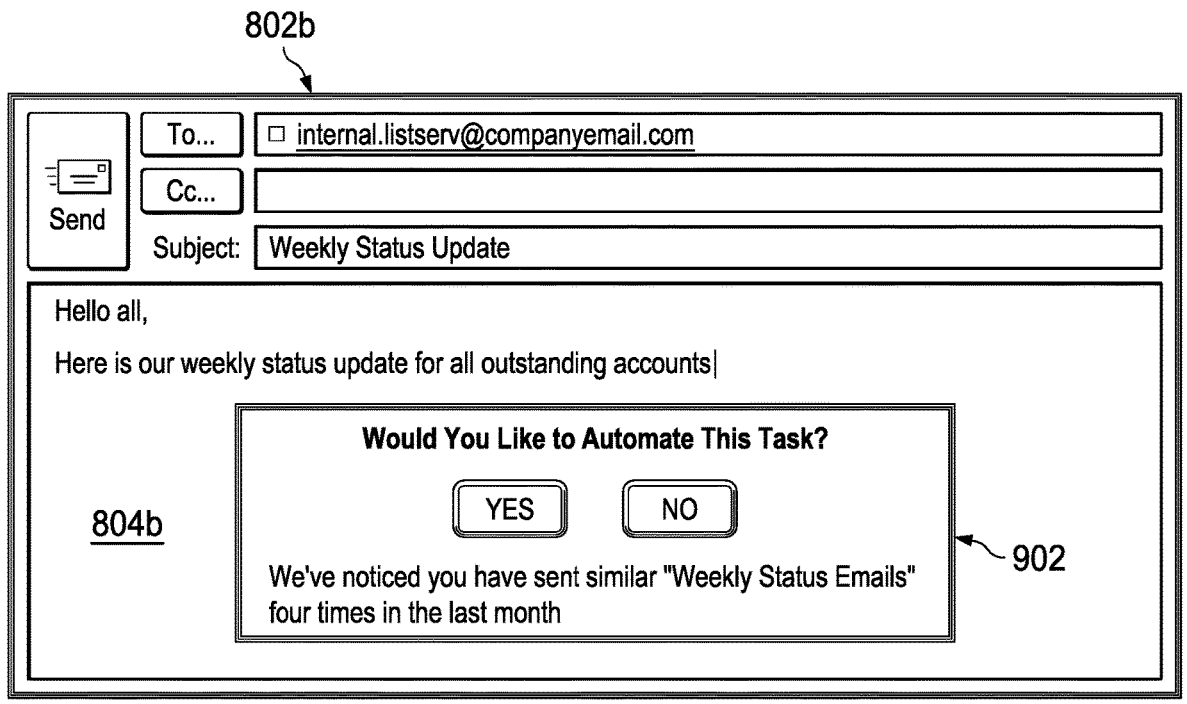
FIG. 9 illustrates an exemplary communication modification interface with a task automation prompt, according to an embodiment.

FIG. 9 illustrates communication modification interface 802b with task automation prompt 902, according to an embodiment. Although particular embodiments of communication modification interface 802b with task automation prompt 902 are illustrated and described in FIG. 9, embodiments contemplate automation platform 110 generating communication modification interfaces 802b with task automation prompts 902 in any configuration, according to particular needs. Additionally, although FIG. 9 illustrates an email communication modification interface 802b with a task automation prompt 902, embodiments contemplate SMS text communication modification interfaces 802b with task automation prompts 902, voice/voicemail communication modification interfaces 802b with task automation prompts 902, and task automation prompts 902 configuring and automating communications of any kind, according to particular needs.

In the embodiment illustrated by FIG. 9, automation platform 110 generates communication modification interface 802b in the manner described with regard to FIG. 8 above. According to embodiments, graphical user interface module 204 may access communications data 214, and a display stored email draft on communication modification interface 802b. In an embodiment, the stored email draft may comprise a blank email template with no recipient, subject, or text information; in other embodiments, the stored email draft may comprise emails in any format comprising any subjects or content and addressed to any recipients. Configuration module 202 may respond to input from one or more input devices, and may add text 804b to the body of the email displayed by the FIG. 9 communication modification interface 802b. According to embodiments, configuration module 202 may continuously store updates to the in-process email draft in communications data 214.

Communication planning module 208 may access communications data 214 and may continuously monitor text 804b and/or any other updates to the in-process email draft for one or more for one or more commonalities that occur in a plurality of separate communications and that may benefit from automation. In the embodiment illustrated by FIG. 9, communication planning module 208 determines that configuration module 202 is drafting a "Weekly Status Update" email. In this embodiment, communication planning module 208 determines that "Weekly Status Update" is a commonality that has occurred in several previous communications, and which may be automated. In other embodiments, communication planning module 208 may locate commonalities in text 804b and/or communications stored in communications data 214 using any comparison criteria.

Having identified the "Weekly Status Update" commonality and automation opportunity, communication planning module 208 stores the "Weekly Status Update" commonality and automation opportunity in communications data 214 associated with the in-process email draft. Graphical user interface module 204 accesses the "Weekly Status Update" commonalty and automation opportunity stored in communications data 214, and displays a task automation prompt 902 to create a new "Weekly Status Update" email template. Configuration module 202 may respond to input from one or more input devices and select "yes" on task automation prompt 902, thereby prompting communication planning module 208 to generate a new "Weekly Status Update" email template. Having generated a new "Weekly Status Update" email template, the communication planning stores the new email template in templates data 216 for future use.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. As will be apparent to one skilled in the art, various modifications can be made within the scope of the aforesaid description. Such modifications being within the ability of one skilled in the art form a part of the present invention.

It is noted that terms like "specifically," preferably," "typically," "generally," and "often" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

Any dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "50 mm" is intended to mean "about 50 mm."

Any documents cited in the Detailed Description of the invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

What is claimed is:

1. A system comprising an automation platform associated with an entity and one or more end user systems, the automation platform comprising a processor and memory and configured to:
select one or more industry-specific, campaign-specific communication templates from one or more communication configuration interfaces provided in response to selecting an industry from two or more industries displayed on an industry selection interface and selecting a particular campaign corresponding to the industry;
generate a branded communication based, at least in part, on input from a rules engine and the one or more industry-specific, campaign-specific communication templates, wherein the one or more industry-specific, campaign-specific communication templates include branding data comprising colors, fonts and intellectual property that customize the one or more industry-specific, campaign-specific communication templates for a specific entity;

modify content of the generated branded communication, generating a modified communication;
revise the one or more industry-specific, campaign-specific communication templates to include one or more modifications made to the content of the generated branded communication;
transmit, using one or more communication channels, the modified communication to at least one of the one or more end user systems;
detecting one or more response communications transmitted by the one or more end user systems in response to the transmitted communication;
assigning to the one or more response communications one or more sentiment scores assessing a degree of positive or negative emotional content; and
modifying the one or more subsequent communications based on the one or more assigned sentiment scores;
monitor communications to the at least one of the one or more end user systems;
identify one or more commonalities in the monitored communications;
display a task automation prompt in response to the identifying of the one or more commonalities; and
create a new industry-specific communication template in response to receiving a selection to the task automation prompt.

2. The system of claim 1, further comprising the automation platform revising the one or more industry-specific communication templates to include one or more modifications selected from:
adding text to the one or more industry-specific communication templates;
removing text from the one or more industry-specific communication templates;
modifying a signature block associated with the one or more industry-specific communication templates; and
adding a prerecorded message to the one or more industry-specific communication templates.

3. The system of claim 1, further comprising the automation platform:
generating a survey comprising one or more survey communications; and
transmitting the one or more survey communications to the one or more end user systems using the one or more communication channels.

4. The system of claim 1, further comprising the automation platform:
generating a communication campaign comprising one or more interrelated communications; and
transmitting the one or more interrelated communications to the one or more end user systems using the one or more communication channels.

5. The system of claim 1, wherein at least one of the one or more communication channels comprises a communication channel selected from:
a voice channel;
a video channel;
an email channel;
a text channel; and
a chat channel.

6. A computer-implemented method, comprising:
selecting, with an automation platform comprising a processor and memory, wherein the automation platform is associated with an entity, one or more industry-specific, campaign-specific communication templates from one or more communication configuration interfaces provided in response to selecting an industry from two or more industries displayed on an industry selection interface and selecting a particular campaign corresponding to the industry;
generating a branded communication to one or more end user systems based, at least in part, on input from a rules engine and the one or more industry-specific, campaign-specific communication templates, wherein the one or more industry-specific, campaign-specific communication templates include branding data comprising colors, fonts and intellectual property that customize the one or more industry-specific, campaign-specific templates for a specific entity;
modifying content of the generated branded communication, generating a modified communication;
revising the one or more industry-specific, campaign-specific communication templates to include one or more modifications made to the content of the generated branded communication;
transmitting, using one or more communication channels, the modified communication to at least one of the one or more end user systems;
detecting one or more response communications transmitted by the one or more end user systems in response to the transmitted communication;
assigning to the one or more response communications one or more sentiment scores assessing a degree of positive or negative emotional content; and
modifying the one or more subsequent communications based on the one or more assigned sentiment scores;
monitoring communications to the at least one of the one or more end user systems;
identifying one or more commonalities in the monitored communications;
displaying a task automation prompt in response to the identifying of the one or more commonalities; and
creating a new industry-specific communication template in response to receiving a selection to the task automation prompt.

7. The computer-implemented method of claim 6, further comprising revising the one or more industry-specific communication templates to include one or more modifications selected from:
adding text to the one or more industry-specific communication templates;
removing text from the one or more industry-specific communication templates;
modifying a signature block associated with the one or more industry-specific communication templates; and
adding a prerecorded message to the one or more industry-specific communication templates.

8. The computer-implemented method of claim 6, further comprising:
generating a survey comprising one or more survey communications; and
transmitting the one or more survey communications to the one or more end user systems using the one or more communication channels.

9. The computer-implemented method of claim 6, further comprising:
generating a communication campaign comprising one or more interrelated communications; and
transmitting the one or more interrelated communications to the one or more end user systems using the one or more communication channels.

10. The computer-implemented method of claim 6, wherein at least one of the one or more communication channels comprises a communication channel selected from:

a voice channel;
a video channel;
an email channel;
a text channel; and
a chat channel.

11. A non-transitory computer-readable storage medium embodied with software, the software when executed configured to:
select one or more industry-specific, campaign-specific communication templates from one or more communication configuration interfaces provided in response to selecting an industry from two or more industries displayed on an industry selection interface and selecting a particular campaign corresponding to the industry;
generate a branded communication to one or more end user systems based, at least in part, on input from a rules engine and the one or more industry-specific, campaign-specific communication templates, wherein the one or more industry-specific, campaign-specific communication templates include branding data comprising colors, fonts and intellectual property that customize the one or more industry-specific, campaign-specific communication templates for a specific entity;
modify content of the generated branded communication, generating a modified communication;
revise the one or more industry-specific, campaign-specific communication templates to include one or more modifications made to the content of the generated branded communication;
transmit, using one or more communication channels, the modified communication to at least one of the one or more end user systems;
detecting one or more response communications transmitted by the one or more end user systems in response to the transmitted communication;
assigning to the one or more response communications one or more sentiment scores assessing a degree of positive or negative emotional content; and
modifying the one or more subsequent communications based on the one or more assigned sentiment scores;
monitor communications to the at least one of the one or more end user systems;
identify one or more commonalities in the monitored communications;
display a task automation prompt in response to the identifying of the one or more commonalities; and
create a new industry-specific communication template in response to receiving a selection to the task automation prompt.

12. The non-transitory computer-readable storage medium of claim 11, wherein the software when executed is further configured to revise the one or more industry-specific communication templates to include one or more modifications selected from:
adding text to the one or more industry-specific communication templates;
removing text from the one or more industry-specific communication templates;
modifying a signature block associated with the one or more industry-specific communication templates; and
adding a prerecorded message to the one or more industry-specific communication templates.

13. The non-transitory computer-readable storage medium of claim 11, wherein the software when executed is further configured to:
generate a survey comprising one or more survey communications; and
transmit the one or more survey communications to the one or more end user systems using the one or more communication channels.

14. The non-transitory computer-readable storage medium of claim 11, wherein the software when executed is further configured to:
generate a communication campaign comprising one or more interrelated communications; and
transmit the one or more interrelated communications to the one or more end user systems using the one or more communication channels.

* * * * *